United States Patent Office 2,828,616
Patented Apr. 1, 1958

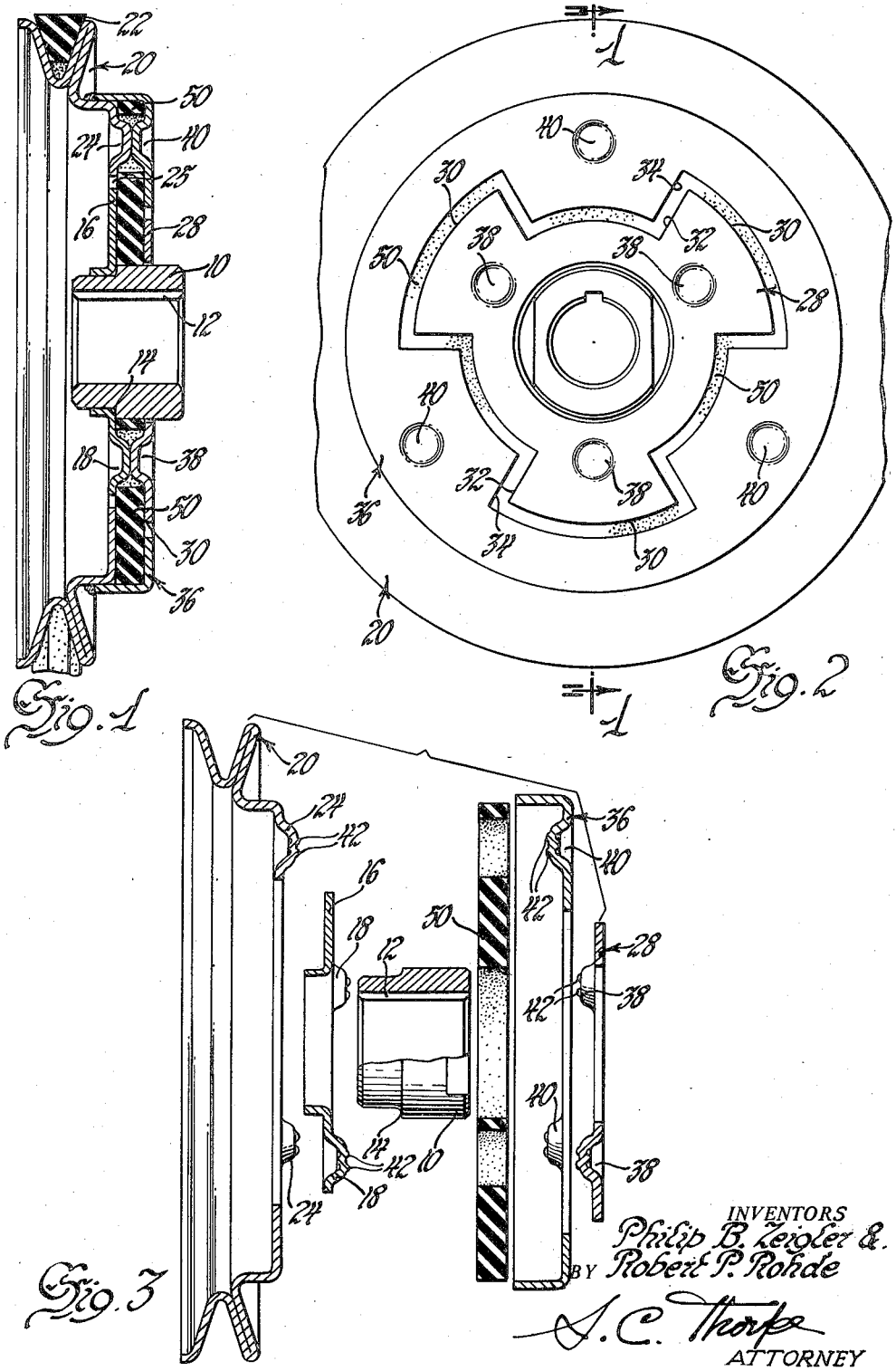

2,828,616

POWER TRANSMITTING ELEMENT WITH DAMPING MEANS

Philip B. Zeigler and Robert P. Rohde, Saginaw, Mich., assignors to General Motors Corporation, Detroit, Mich., a corporation of Delaware Application November 17, 1955, Serial No. 547,386

5 Claims. (Cl. 64—27)

This invention relates to rotatable power transmitting devices and in its most particular aspect concerns a pulley having means associated therewith adapted to damp out noise-producing vibrations.

In the operation of a hydraulic vane pump such as shown, for example, in Gardnier et al. Patent Nos. 2,544,987 and 2,544,988, it was found on driving the pump through a pulley fixed to the pump drive shaft, the pulley being belted to a second pulley fast on the output shaft of a suitable power plant, that vibrations manifested as noise in the form of "squeal," are prone to occur; and especially if the pump is to some extent worn in. We have determined that these vibrations derive from the pressure-loading of the vanes in the suction area, a condition which brings about rapid smoothing off of surface imperfections in the cam ring, which when the pump is first run, act to entrap oil, giving a lubricating effect tending to reduce the severity of the vibrations. In any case, the vibrations sound off as noise at the face of the drive pulley and are most objectionable in applications where quiet pump operation is a desideratum.

Our invention has for its principal object to modify the structure of the drive pulley or equivalent instrumentality so that the vibrations are in effect absorbed therein and are not manifested as noise. Other objects and features of the invention will be apparent from the following specific description, addressed to a preferred embodiment. The description will proceed with reference to the accompanying drawings wherein:

Figure 1 is a section through a pulley conforming to the invention;

Figure 2 is a front elevational view of the pulley; and

Figure 3 is an exploded view showing the several parts comprised in the assembly of Figure 1.

It will be seen that the hub 10 of the pulley has a keyway 12 therein through which the hub may be connected to the pulley drive shaft, not shown. The hub comprises an annular shoulder at 14 to seat a backing plate 16, the latter being fixed to the hub 10 as by electric furnace brazing. The plate 16 is stamped or otherwise formed to provide a plurality of portions 18 projecting from the body of the plate and is surrounded by a sheave 20 for a drive belt 22, the sheave being slightly spaced from the backing plate as indicated at 25. Like the backing plate, the sheave includes a plurality of projections 24.

Spaced laterally of the backing plate 16 and surrounding the hub 10 is a reinforcing plate 28, which is not fixed to the hub. This reinforcing plate comprises a plurality of radially extending tongues 30 providing abutments 32. The abutments will be noted (Figure 2) as slightly spaced from complementary abutments 34 formed incident to the fabrication of an outer retainer element 36 concentric with the reinforcing plate 28 and co-planar therewith. Both plate 28 and the retainer 36 comprise projections, 38 and 40, respectively, similar to the projections 18 and 24.

Ancillary projections 42 (Figure 3) facilitate welding of the parts desired to be joined.

As shown in the drawings, the retainer element 36 is welded to the sheave 20 while the backing plate 16 is similarly fixedly connected to the reinforcing plate 28.

Positioned between the sheave and retainer and between the backing and reinforcing plates is a vibration damping member 50, which is apertured to permit of the welding connections above. This member preferably represents a disk of rubberized fabric. The material sold under the trade name "Fabreeka" is quite satisfactory for this purpose.

With the parts fabricated and assembled as illustrated, it should be apparent that in operation of the pulley the torque from the sheave 20 is transmitted to the hub 10 via the backing plate 16 through the damping member, causing torsion of the latter. It should be equally apparent that any vibrations involving the sheave as a conduit are effectively absorbed by the damping member.

Having thus described and illustrated our invention, what we claim is:

1. A rotatable power transmitting member comprising a hub encircled by an outer element adapted for engagement with a complementary device for the transmission of motion therebetween, said outer element being spaced from said hub by an inner element concentric therewith and encircled thereby, said inner element being fixed to said hub, a second outer element about said hub in laterally spaced relation to said first outer element, said second outer element having an inner abutment and being separated from said hub by a second inner element concentric therewith and encircled thereby in spaced relation, said second inner element being laterally spaced from said first inner element and having an abutment complementary to and spaced from said first abutment, damping means interposed in the spaces between said inner and outer elements and means providing for fixed connections between said outer elements and between said inner elements through said damping means whereby on rotation of said member torque is transmitted from said first outer member to said hub via said damping means with torsion of the latter.

2. A power transmitting pulley comprising a hub having a backing plate fixed thereto, a sheave spaced from and encircling said hub, a reinforcing plate about said hub and spaced laterally of said backing plate by a vibration damping member, said reinforcing plate having at least one fixed connection with said backing plate through an aperture in said damping member and including a peripheral abutment, and a retainer element encircling said reinforcing plate in spaced relation thereto and having an abutment complementary to and spaced from said first abutment, said retainer element being fixedly connected at least at one point to said sheave through an aperture in said damping member.

3. A power transmitting pulley comprising a hub having a backing plate fixed thereto, a sheave spaced from and encircling said hub, a reinforcing plate about said hub and spaced laterally of said backing plate by a vibration damping member formed of rubberized fabric, said reinforcing plate having a plurality of fixed connections with said backing plate through apertures in said damping member and including a plurality of peripheral abutments, and a retainer element encircling said reinforcing plate in spaced relation thereto and having a plurality of abutments complementary to and spaced from said first abutments, said retainer element being fixedly connected at a plurality of points to said sheave through apertures in said damping member.

4. A power transmitting pulley according to claim 3 in which said fixed connections are achieved by projection welding.

5. A rotatable power transmitting member comprising a hub encircled by an outer element spaced from said hub by an inner element encircled thereby, said inner element being fixed to said hub, a second outer element about said hub in laterally spaced relation to said first outer element, said second outer element having an inner abutment and being separated from said hub by a second inner element encircled thereby in spaced relation, said second inner element being laterally spaced from said first inner element and having an abutment complementary to and spaced from said first abutment, damping means interposed in the spaces between said inner and outer elements and means providing for fixed connections between said outer elements and between said inner elements through said damping means whereby on rotation of said member torque is transmitted from said first outer member to said hub via said damping means with torsion of the latter.

References Cited in the file of this patent

UNITED STATES PATENTS

| | | |
|---|---|---|
| 1,894,432 | Watson | Jan. 17, 1933 |

FOREIGN PATENTS

| | | |
|---|---|---|
| 305,921 | Great Britain | Apr. 14, 1929 |
| 580,901 | Great Britain | Sept. 24, 1946 |